Aug. 11, 1936.  E. R. LOCHMAN  2,050,347
GENERAL UTILITY MACHINE TOOL
Filed Sept. 30, 1932   5 Sheets-Sheet 1
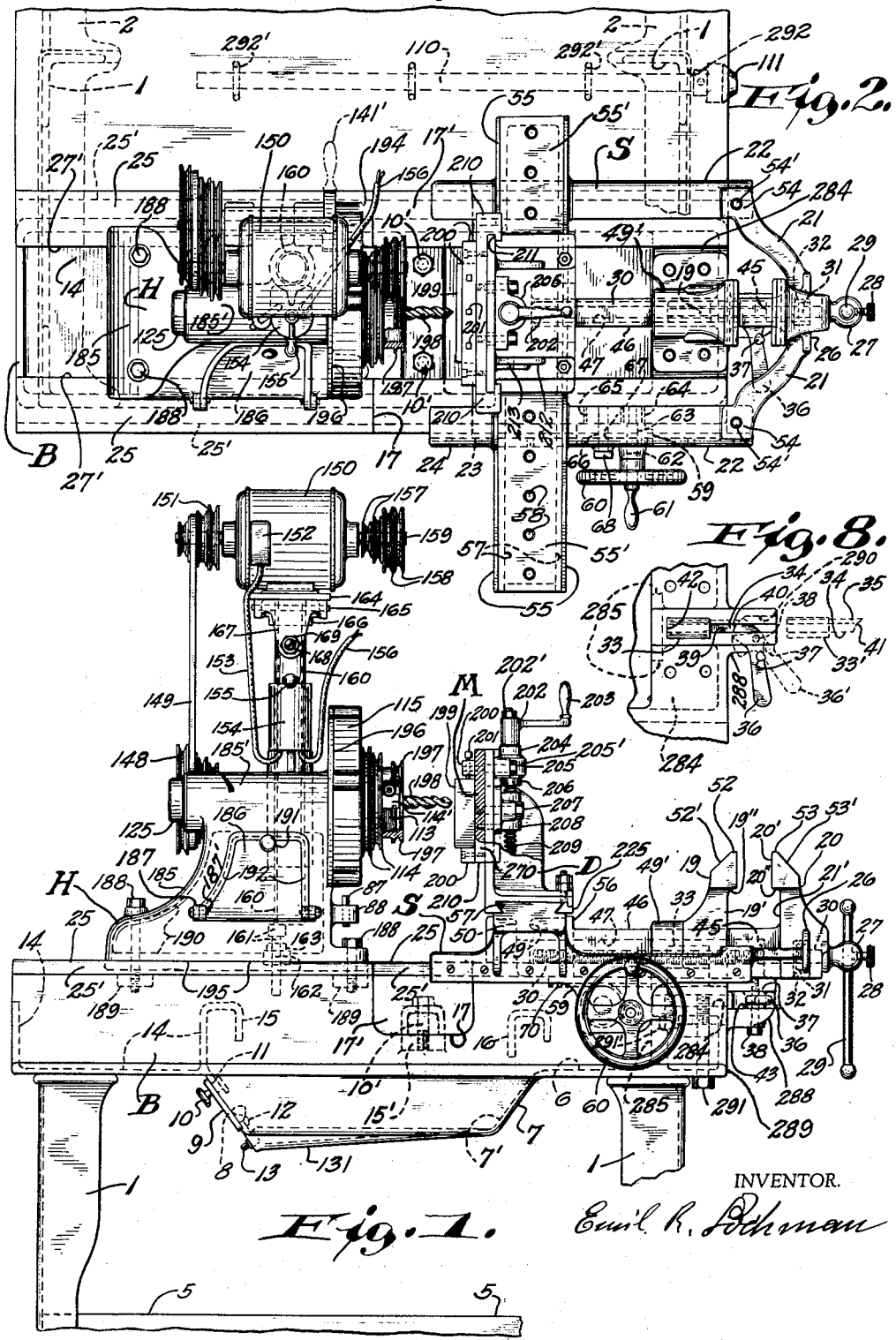
INVENTOR.
Emil R. Lochman

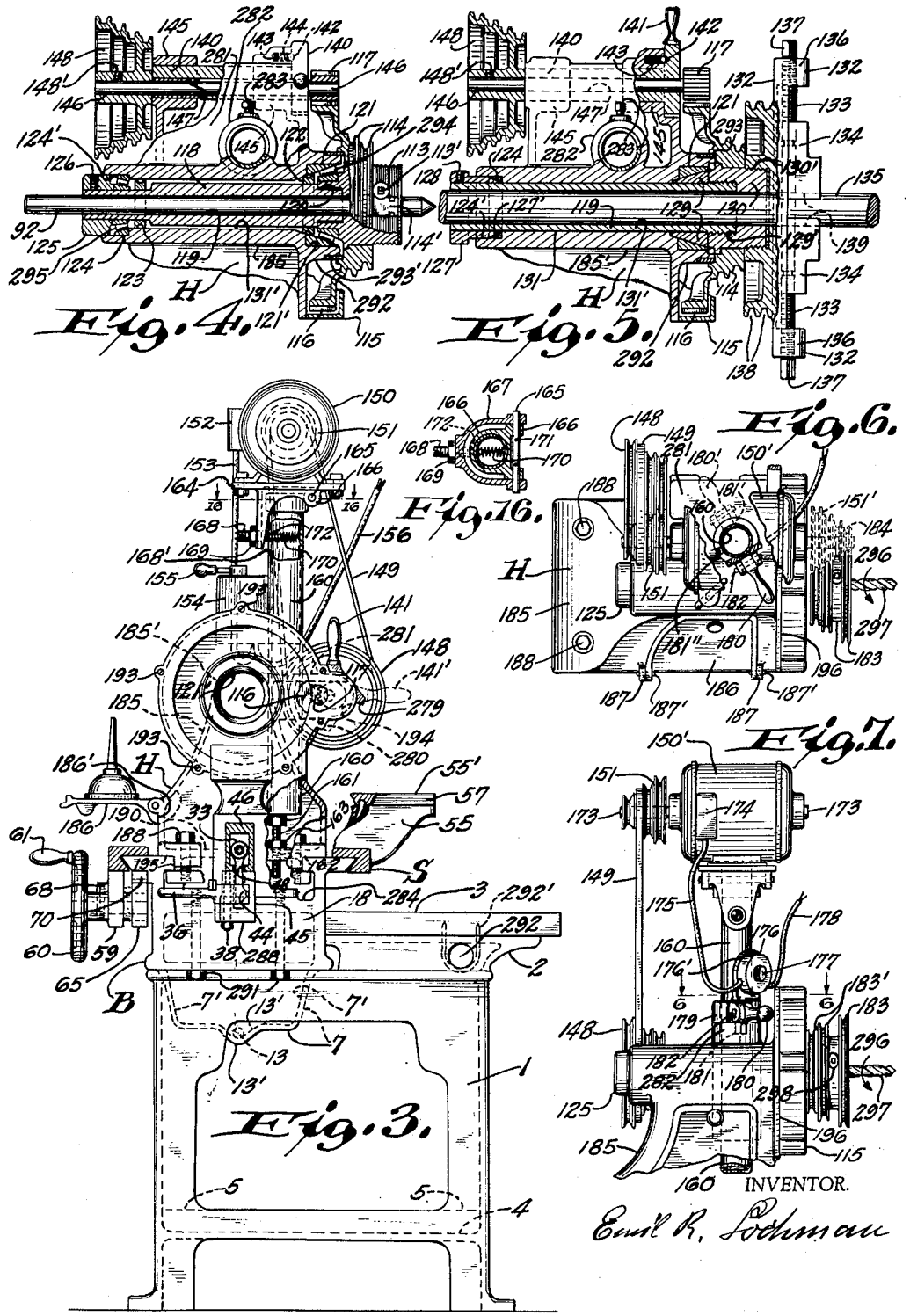

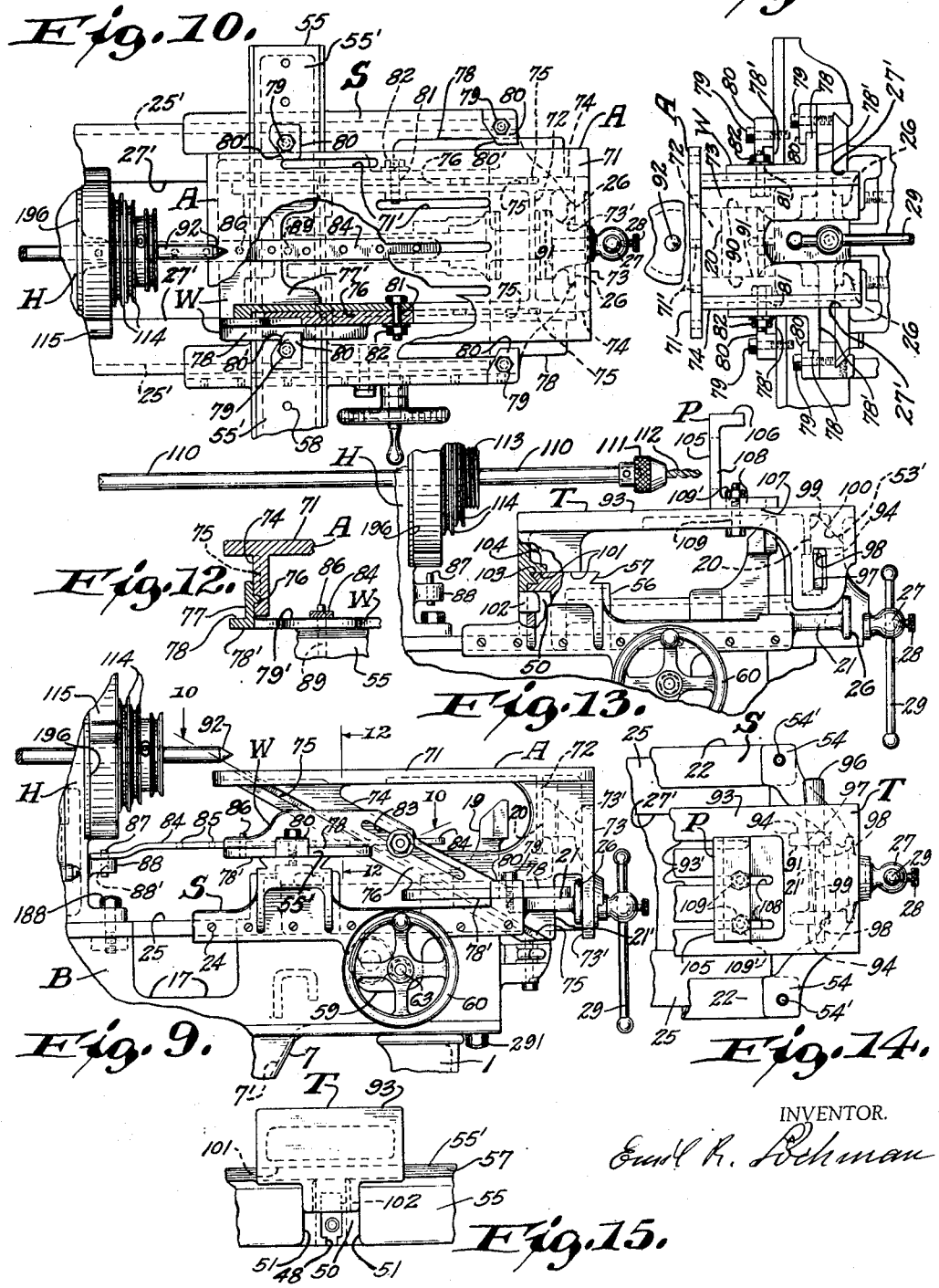

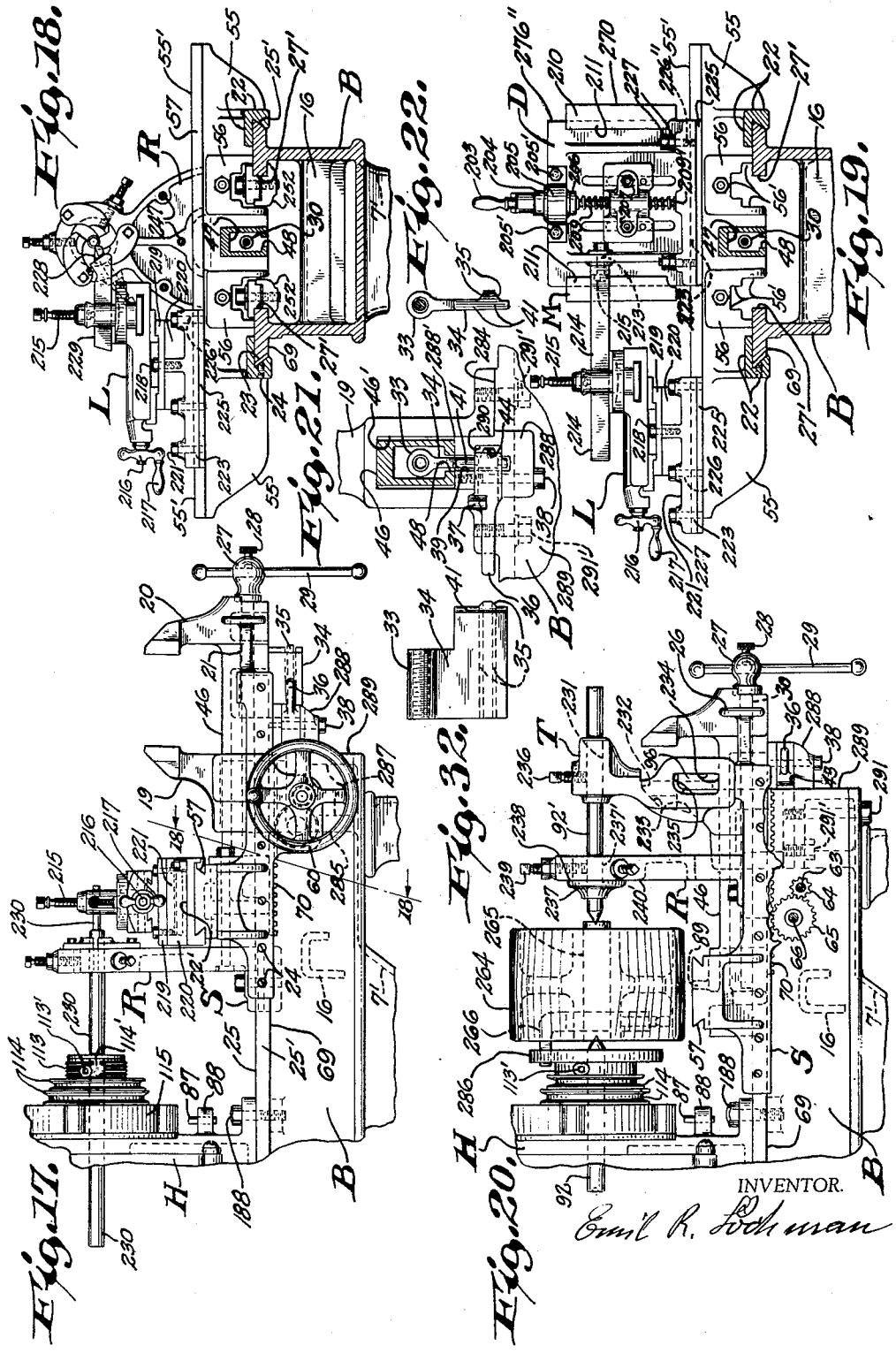

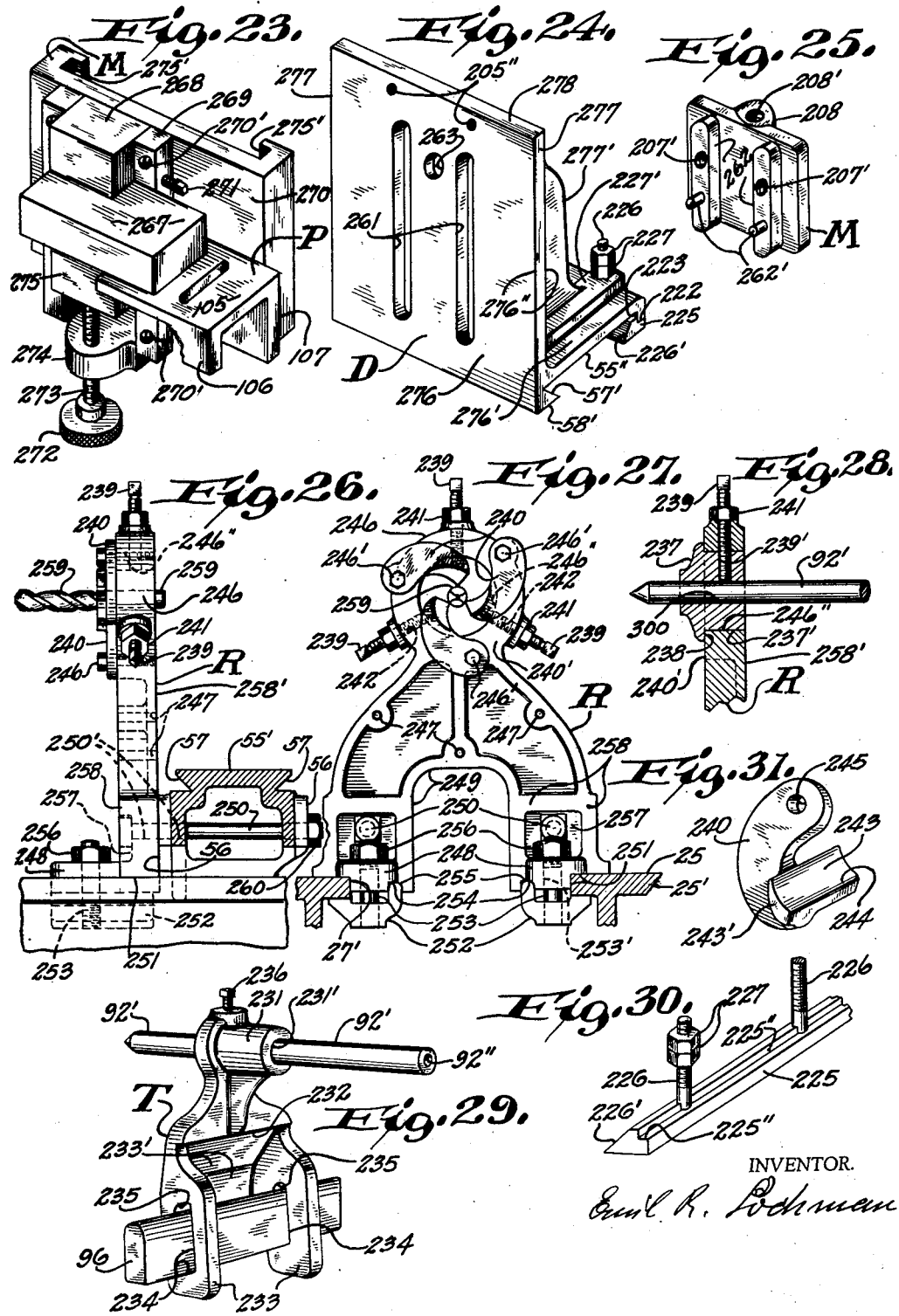

Patented Aug. 11, 1936

2,050,347

UNITED STATES PATENT OFFICE 2,050,347

GENERAL UTILITY MACHINE TOOL

Emil R. Lochman, Milwaukee, Wis.

Application September 30, 1932, Serial No. 635,535

44 Claims. (Cl. 29—27)

This invention relates to a utility machine tool for general service in various industries and its utility service combines the use of a drilling machine, a vise, a lathe, and a milling machine, as well as other services.

The primary object of this invention is to provide a utility machine of maximum service while using a minimum of space and power.

A further object of the invention is to provide a machine for large as well as small work, with a considerable variety of driving speeds for the headstock spindle and the use of only one gear and one pinion for a back gear drive.

Another object of the invention is to provide a headstock carrying its own motor on a tubular support in an endwise and pivotally adjustable manner, while the respective pulleys or stepcones used for driving the spindle are located at the free front and rear ends of the headstock as well as the motor, allowing a single driving belt to be readily changed from one end to the other, and used for direct as well as backgear driving.

A further object is to provide a utility machine with an exchangeable unit system for its various uses, including exchangeable spindle units for the headstock having hollow spindles of larger or smaller diameter fitting the same headstock and carrying their own respective driving gear and sheave, and being endwise adjustable and exchangeable.

A further object is to provide a suitable slide with a crossbeam for readily mounting, positioning and exchanging the various drill, lathe and milling units used in connection with the headstock; while the combination of a vise, a slide and a crossbeam in itself is a valuable invention.

Another object of the invention is to provide various exchangeable worksupports to be used in connection with the headstock to operate on stock at right angles to the axis of the spindle as well as in line therewith, including an adjustable horizontal table, operated for its adjustment as well as its operation on stock on the same screwspindle, preferably that of a vise.

A further object of the invention is to provide a machine bed of great rigidity, being of box shape with a centrally located sink giving special re-enforcement, while at the same time furnishing a receptacle for shavings and oil or cutting compound, and furnishing draining for all such contents, as well as furnishing a tool compartment.

Another object of the invention is to provide a double feeding system to the slide, with a quick release for the nut of the screw feed, in a manner that the nut travels endwise with the screw, thereby forming a limit gauge for turning or cutting and a depth gauge for boring and reaming with the machine.

Still another object of the invention is to provide an angle plate for drilling with a special gib fitting the crossbeam in a manner so it may be adjusted endwise and firmly mounted in a selected position, or it may be set to slide on said crossbeam and be readily supplied with an apron feeding at right angles to said crossbeam for milling operations, while the feedmotion of the angle plate along said beam is supplied by a tool rest screw, coupled to said angle plate by a connecting bar held in the tool post of said tool rest.

Another object of the invention is to provide a special combination tailstock steady rest, follow rest and chuck, having new simple and effective adjustable chuck jaws used for chucking tools as well as following revolving stock and the like.

A further object of the invention is to provide a tailstock and other attachments to be readily and firmly mounted either on the stationary jaw or the moving jaw of a vise with a suitable wedge.

A further object of the invention is to provide a large powerful headstock with a hollow spindle of considerable diameter used in connection with a combination tailstock allowing the free passage of long bar stock or pipes through the hollow spindle of said headstock for operating or cutting such stock which is considerably longer than the entire machine, and readily passes the base of said tailstock.

Another object of the invention is to provide a headstock spindle having a permanent chuck, said chuck carrying the driving means for the spindle. Furthermore a hollow spindle with permanent chuck having a limit capacity of the bore of said spindle and a system of long adjustable centers fitting said bore for gauging and alining and setting stock for accurate boring milling and the like.

A further object of the invention is to provide a headstock carrying its own motor in a pivotally adjustable manner, allowing a non-reversible motor with a single pulley or stepcone to operate the direct drive, as well as the backgear drive located at opposite ends of the headstock.

With the above and other objects in view the invention consists of the improved utility machine, and its parts and combinations, as I will proceed now more particularly to explain and finally claim.

In the accompanying drawings illustrating the invention, in the several figures of which like parts are similarly designated, Figure 1 is a side elevation of the complete machine set up for drilling. Fig. 2 is a top view of the complete machine set up for drilling as shown in Fig. 1. Fig. 3 is an end view showing the front of the machine with parts broken away to show the principal construction and combination of parts of the machine, with the headstock spindle removed. Fig. 4 is a sectional top view of the headstock spindle and back gear drive, also showing bearings and related parts of the headstock. Fig. 5 is a like sectional top view as Fig. 4, but showing a spindle of larger diameter and larger bore fitting the same bearing of the headstock as in Fig. 4 by replacing the roller bearing by a plain bearing but retaining the taper cone of the roller bearing. Fig. 6 is a top view of the headstock with parts broken away showing motor adjusting parts with the motor in one working position, and showing the opposite working position in dotted lines. Fig. 7 is a side of the headstock with its non-reversible motor further showing a common off and on switch mounted on the reversing collar, all forming a side view of Fig. 6 with parts broken away. Fig. 8 is a top view of the locking lever and adjustable nut for the vise, showing said parts unlocked and the nut in an outer position in dotted lines. Fig. 9 is the side view of an adjustable table attached to the machine, other parts being broken away. Fig. 10 is a top view of said adjustable table with parts broken away to show details of the adjusting arrangement. Fig. 11 is a front view of said adjustable table and related parts of the machine to which it is attached. Fig. 12 is a detail sectional view of said adjustable table, showing its two principal parts and the tongue and groove slide by which they are connected and adjusted. Fig. 13 is a side view of another table with parts broken away showing its quick locking device fixed on the crossbeam and the moving jaw of the vise by a suitable wedge, also showing the long centering bar with chuck and drill for horizontal boring. Fig. 14 is a top view of the table shown in Fig. 13 with parts broken away, principally showing its locking device on the moving jaw of the vise with the said wedge. Fig. 15 is a front end view of said table showing its locating and locking parts in its position on the crossbeam. Fig. 16 is a cross sectional view on line 16—16 of Fig. 3 showing the tension spring adjustment for the motor and its belt. Fig. 17 is a side view of the machine with parts broken away showing a set up of the machine for turning on bar stock with the rest R bolted to the crossbeam and used as a follow rest, the tool rest L in proper position for turning, showing the vise nut unlocked and in sliding outward position, as the slide is operated by the handwheel 60. Fig. 18 is a front end view of Fig. 17 showing the same relation of parts, and showing the bed and slide in cross section taken on line 18—18 of Fig. 17. Fig. 19 is a front end view like Fig. 18 showing principally the crossbeam with a set up for milling and showing the milling-unit M properly connected to the drill unit D, and the latter connected by a coupling bar to the tool rest L. Fig. 20 is a side view of the machine with parts broken away showing a set up for heavy lathe work, turning a large pulley, and showing the tailstock T and the rest R used as a tailstock, both being coupled together for heavy resistance by the long center bar 92', the tailstock T being firmly held on the stationary vise jaw by a large wedge. Fig. 21 is a front end view of the bed B with parts broken away showing the quick release device for the vise nut in its locked position and showing the slots in which it operates. Fig. 22 is a front end view of the vise nut, showing its key and curved locking edge. Fig. 23 is a perspective view of the milling apron showing a set up for a block of stock clamped in a vise and supported by the universal angle block P. Fig. 24 is a perspective view of the drill unit D showing its machined vertical slots as well as the special gib for mounting or sliding said unit on the crossbeam. Fig. 25 is a perspective view of the milling nut, showing the extending guide pads and pins for locating the milling nut on its apron. Fig. 26 is a side view of the rest R used as a chuck, and holding a drill for drilling revolving stock, and shown firmly clamped in position against the side of the crossbeam and moving therewith while its feet are held in sliding position on the bed rails. Fig. 27 is a front view of the rest R used as a chuck and holding a drill for the purpose and in the manner described for Fig. 26. Fig. 28 is a vertical cross section of the center bushing 237 for the rest R, holding the center bar 92' for tailstock use. Fig. 29 is a perspective view of the tailstock T, showing its respective slotted lugs and the large wedge passing through them for firmly mounting this tailstock on the jaw of the vise. Fig. 30 is a perspective view of the special gib for firmly mounting, or holding the said units D and M in a sliding position on the crossbeam. Fig. 31 is an enlarged perspective view of a chuck jaw used on the rest R, especially showing its inner gripping section and tooth edge. Fig. 32 is a side view of the vise nut showing its flange section with its key, and the threaded nut section for the vise screw.

Referring now to the drawings and especially to Fig. 1, B is the bed, resting and mounted on the legs 1 having an upper extension 2 onto which is mounted the bench top 3; said legs are provided with a cross rib 4 onto which the shelf 5 is mounted which is required for holding the units and parts not in use on the machine, in storage.

A storage arrangement for the units and parts as well as tools is provided for in this utility machine, as it will be used in many places aside from machine shops where tool rooms and tool storage is provided for; therefore the bed B is made of box shape and has a tool compartment 14, the large headstock H provides in its hollow cored out section 190 a storage place for small tools, accessible by the small door 186 hinged to the lugs 187 by the hinge-pins 187', said door forming a small tray when opened and held in position by the nose 186' striking the side of the headstock (see Figs. 1, 3 and 6). A storage place is further provided for the long centering bar 110 under the bench top 3 by coring a hole 292 in said leg 1 and driving staples 292' in line with said hole in the under side of said bench 3.

The bed B is made in box shape, and has a centrally located sink 7 for purposes of extreme rigidity as well as for holding shavings, oil etc. in its hollow basin 7' which is provided with an opening 8 for removing shavings, and which is closed by the cover 9 held in place by the latch 11 by turning the knob 10 to which it is pivotally connected. The sink 7 is further provided with a draining groove 13' having a draining hole shut by the plug 13 and removable for draining the sink. The box braces 15 and 16 cast in and connecting the sides of the bed, further increase its rigidity. The size and capacity of the disclosed embodiment permits one to swing work in diameter of 24 inches over the bed, and to swing a diameter of 14 inches over the crossbeam. Thus provision is made for large as well as small work, as the units for holding either tools or work are relatively medium in size and can easily be handled by one man in setting them on, or taking them off of the crossbeam. As these machines will be used to a great extent for repair work in garages provision is made by means of the sink reenforcement in the center of the bed to cut a gap 17 so that an automobile wheel with its tire attached can be swung in said gap 17, the slide being made sufficiently short to permit of such a mounting of a wheel S, (see Fig. 1). Thereby the bed B is permitted to swing work in diameter of 36¼ inches through said gap, and thereby allow a brakedrum of an automobile to be trued up on the machine without taking off the tire. It will further be noticed that the headstock H is endwise adjustable on the bed of the machine, and can be set backward to swing an automobile wheel with its tire through said gap without making said gap any wider than needed for said purpose, which will not interfere with the other work to be handled on said machine. The front end of the bed 289 (see Figs. 3, 8 and 21) has the horizontal web 284 and the extending slotted bracket 288 whose slot extends backwards through said web 284 to the end 42 as well as upwards through the upward extension 288' of said bracket 288 (see Fig. 21) on which the vise ram 46 rests and travels. Over said ram and said extension the slotted part 46' of the stationary jaw 19 is passed and securely bolted to the bed by the four bolts 291 291'. Said bracket 288 has another slot 43 into which the locking lever 36 is set, and held for pivotal action by the bolt 38. Said lever has an upward extending lug 37 that limits its swinging motion by striking against the side of said bracket 288, when the lever is swung far enough to let the vise nut 33 pass out of the slot 39 as shown in Fig. 8. For the common use of the vise, the nut 33 is passed into the slot 39 and held rigid in position by swinging the lock lever 36 so its face 40 wedges against the face 41 of said nut, which also brings the key 35 in tight contact with its keyseat 44 (see Fig. 21) which key keeps the nut 33 in constant alinement with the vise screw 30, by further holding the nut tight against the stop 42. The main supporting body of said nut is its flat section 34.

The slide S with crossbeam 55 form a very important feature of this machine, by bringing the various units for holding tools or material in working position with the headstock spindle and tools or material carried by it. The slide S comprises a frame like structure with its sides 22 forming gibs fitting the gibs 25' of the bed rails 25. The front gib is provided with the adjustable gib 23 provided with gib screws 24 for setting and taking lost motion out of said slide S. The crossbeam 55 set at right angles to said sides 22 and extending outward therefrom, especially to the operating side, is cast in unit therewith, as is the centrally located ram 46 terminating into the vise jaw 20 from which the arms 21 extend to the outer ends of the sides 22, thereby completing a frame like structure of great rigidity. The movable jaw 20 has a cored out section 32 (see Fig. 2) forming a chamber through which the vise screw 30 passes and is held for endwise motion by the collar 31, said screw passes through a suitable bore 45 in the solid section 45 into the long cored out section 47 of the ram, which terminates into a narrow slot 48, through which the flat section 34 of the nut 33 passes, so that the entire slide may be passed on to the rails 25 of the bed B from the front end of the machine, and when the nut 33 has reached the stop 42 it is locked by said lever 36, and the slide is then operated by the vise screw 30; however for many operations of the machine the handle 29 is required to be set at a certain distance from the end, as shown in Figs. 1, 9 and 17, where it is held in said position by the small thumbscrew 28 tapped into the screw head 27. For instance when the machine slide S is operated by the handwheel 60, and the vise nut 33 is used as a stop or depth gauge, then the handle must be held in its centre for balancing by said thumb screw 28. The slide S has a lug 59 cast on the operating side 22 carrying a bearing 62 for shaft 63 which carries handwheel 60 and pinion 64. This pinion meshes with the spur gear 65 mounted on pivot 66 turning in bearing 67 (see Figs. 2 and 20), and said gear 65 meshes with the rack 70 mounted on the lower edge 69 of the rail 25. The slide S is operated by means of said mechanism and handwheel 60 or its handle 61, when the lock handle 36 is set in said dotted position shown in Fig. 8, thus releasing the nut 33 and vise screw 30. It is thus noted that said slide S may be operated at will, either with the vise screw or with said hand wheel 60 within a few seconds' time by manipulating the lock handle into its locked or open position. This is of great importance for many operations of the machine where this quick change is required, as often either the vise screw or the handwheel is of easier reach for the operator, and many times both means are interchangeably required for operating on the same piece of work. The stationary vise jaw 19 has a reduced rearward extension 49' fitting into the cored out socket 49 of the crossbeam 55, thus extending the travel of the slide S. The crossbeam 55 has an accurately finished surface 55' which is used as a surface plate for laying out or fitting work, as well as for holding stock to be operated by the machine, for which purpose tapped holes 58 are provided (see Figs. 2 and 10). The crossbeam is further provided on both of its sides with the finished pads 56 and the gibs 57 extending along the top edges the entire length of the crossbeam. The location and bearing of the vise screw is of standard design while its nut and its application is new, and in assembling the slide S said nut must be passed into the vise core of the ram before said vise screw is inserted, and the retaining collar 32 is mounted thereon.

The adjustable table A is used for horizontal boring and the like, it is mounted on the slide S and has a vertical adjustment for accurately locating and lining up the work for boring etc. for which purpose the long center bar 92 is held in endwise sliding position in the accurately reamed hole 119 of the spindle 118, which hole is also the largest diameter the chuck 113 will accommodate (see Figs. 4, 9 and 10). This allows the long bar to be set out any desired distance so its point is set against the work and the table raised or lowered until said center strikes the exact line or center mark desired. Said table A is made up of two principal sections, the table section 71 and the wedge section W which is used for raising and lowering said table section. The table A, like all units used in connection with the slide S and crossbeam 55, is easily attached thereto or taken off.

The wedge section W has four ledges 78 with finished bottoms 78' resting in pairs on the surface 55' and on the finished pads 54 of the slide S. Four clamping blocks 80 are held by capscrews 79 in suitable position to let said four ledges 78 either slide for adjusting the table, or to lock them for operating on stock mounted on the table. Said clamping blocks 80 have setting faces 80', and the blocks are turned so these faces clear the ledges 78 when the table is removed or set onto the slide S. As shown in Figs. 9 and 10 the table A is in the act of being adjusted, the nuts 82 on bolts 81 are loosened, so that said bolts mounted in the table section 71 may slide in the slots 83 of the wedge section W. The further connection between said two sections is the inclined adjusting groove 75 in both sides of the table section, and the tongue 76 to slidingly match said groove, forming part of the wedge section on its two sides 77, which embrace said two sides 74 of the table section in sliding contact. The table section 71 has a vertical guide formed by the ledge 72 bearing against the moveable jaw 20 (see Figs. 9, 10 and 11) and its back web 73 having its inner face 73' bearing against the finished pads 26, which also reinforce the connection of arms 21 and the jaw 20, being cast in unit therewith. The lower end of the sides 74 fit between the finished edges 27' of the rails 25 and have notches 21' to straddle the arms 21. The wedge section W has a flat web 77' (see Figs. 10 and 12) connecting its two sides, and having a sliding bearing on the surface 55' of the crossbeam, and is provided with the adjusting pin 86. The headstock is also provided with an adjusting pin 87 driven into the lug 88, in the bore 88'. For raising or lowering the table section 71 said two adjusting pins are connected by the adjusting bar 84 dropping into the holes 85 nearest the pins, and moving the slide S until said bar drops onto said pins with its holes 85; then, moving the slide against the stationary headstock with the vise screw 30, while the wedge-section W is also held stationary by said bar 84, the table section 71 is raised upward to the desired height; then the nuts 82 of bolts 81 are tightened until the sides of both sections are firmly locked in position; then said bar 84 is removed, and the table is now ready to be operated with the slide S. When the table is to be lowered the said process is repeated, but the slide is drawn away from the headstock H. The table 71 is provided with suitable slots 71' for holding the work.

The table T is another unit, and is required where a lighter table with definite level is needed that can be quickly attached or removed from the slide S. Fig. 15 shows the front of it, with its locating lug 102 reaching into the socket 50 with its sides 51 forming a definite center alinement for said table T, while its gib 103 and its ledge 104 with their bottom 101 firmly lock and seat the front of said table on the crossbeam 55 with its gib 57. The rear end of said table has a pair of lugs 94, and a locating ledge 99 bearing against the face of the moving jaw 21 of the vise, while the face of a rib 100 locates and bears against the bevel 53' of said jaw. For quickly and firmly mounting said table on said jaw a large wedge 96 is driven through the slots 97 in said lugs 94, and bearing tightly against the neck 21' of said jaw locks said table firmly on said moving jaw 20; it will be noted that a clearance 98 is left open in said slots 97, allowing proper drift for said wedge 96. The table top 93 is provided with suitable slots 93', and the universal angle plate P is bolted thereto by bolts 109 which pass through the slots 108 in said angle plate, and it will be noted that said slots are irregularly spaced, allowing sideways displacing of said angle plate to suit different set ups. In the set up shown in Fig. 13 the long center bar 110 is provided with the chuck 111 holding the drill 112, for reaching long and deep places in work for horizontal boring. Said center bar 110 is also used for lining up and setting the stock both centrally and horizontally. All of these long centers and this centerbar are ground to a standard size, snugly fitting the bore 119 of the spindle 118, so that said long bore 119 keeps said centers in true alinement. The universal angle plate P has three sides of different width, two of which are slotted as shown, and it is used with all units for boring and milling. Both tables A and T are bearing against the sides of the moving jaw 90 with the surfaces 91 for proper alinement, (see Figs. 11 and 14).

The headstock H will now be described. The main body 187 has guideways 195 at the bottom fitting the rails 25 of the bed B, as well as their inner edges 27' see Figs. 2, 18 and 22, on which the headstock is adjustably mounted by capscrews 188 engaging bars 189 into which they are tapped for mounting. The upper part of the body terminates into the spindle casing 185' having a bore 131' and counter bores 294 and 124' into which the cups 121 and 124 of the rollerbearings 294 295 are pressed, then said roller bearings are passed onto the spindle into their respective places as shown and the oil retainers 122 123 are also passed and lightly driven into their respective places, so they retain the lubricating oil for their respective bearings in a manner to circulate through the rollers; then the adjusting nut 125 is screwed on the reduced and threaded rear end of the spindle 118 and tightened until all lost motion is taken out of the spindle, then the setscrew 126 is tightened and the spindle is ready to run. One of the new features of this spindle is the permanent chuck forming its nose. While the outside of same has a screw thread for holding other chucks, pulleys or the like, the rear end of said permanent chuck carries the combination sheave and gear 114 116 for direct as well as back-gear driving of said spindle. Said permanent chuck 113 has a double jaw 114' and the operating screw 113' and is preferably forcibly screwed onto the reduced front end 120 of the spindle 118, and said chuck and spindle have an accurately machined bore throughout of the limit capacity of said chuck, for receiving bar or pipe stock, held for operations by said chuck, or for holding the long center bars, for alining, spotting or holding work for various operations. Said chuck is self-centering and is further used for holding drills reamers and other tools. The front of the headstock is reinforced by the large flange 196 on which the gearcasing 115 is mounted, covering the large gear 116 as well as the pinion 117, the latter being mounted on shaft 146, passing through the excentric bearing 147, of the excentric 140 which is pivotally mounted in bearings 145 and has a flange 140, provided with a handle 141, which when in upright position as shown in Figs. 3 and 4, brings the pinion 117 in engagement with the gear 116, and when in dotted position it turns the excentric for disengaging said pinion from said gear, in which position the nose 279 strikes the face 280 for a stop. A socket 143 is bored into the wall of the bearing 145 receiving the spring 144 and on top of it the ball 142 which the spring holds in the countersinks 142 provided for each position of said handle 141 retaining it in its set positions, by yielding contact. Fig. 5 shows said pinion and related parts out of engagement with the gear 116. Fig. 5 further illustrates the exchangeable spindle unit for the headstock H, fitting the same bore 131', but having the roller bearings 294 295 removed, however retaining their respective cups 121 124 of hardened ground steel. This arrangement provides the space for the spindle 131 with its larger diameter and larger bore, for handling bar and pipe stock of considerable diameter. A spindle nose 130 is forcibly screwed on the spindle 131 and forms part of it, having the same diameter as the chuck 113, and carrying the same combination sheave and gear 114 116; the cone 129 preferably of hard bronze is also firmly mounted on the spindle and forms part of it, and the adjusting nut 127 is screwed on the rear end of said spindle, and meshing with the taper cup 127' is adjusted to take out endplay and lost motion of the spindle, while the bore 131' forms the main bearing of it. A large chuck 132 having jaw screws 133, jaws 134 with gripping faces 139 holds the stock 135; it further has a double sheave 138 cast onto the rear part of its body, and a threaded hub fitting the thread 130' of the spindle nose. Said chuck has a hole fitting the bore of the spindle for passing and centering the stock having the same size, it has the regular drive as the spindle 118, but in addition thereto is provided with said double sheave 138 which registers with the double sheave 158 carried by motor 150 and its shaft 159 and is for the purpose of furnishing a double belt, powerful direct drive to suit the capacity for larger stock handled by said chuck. The stepcone 148 is mounted on the rear end of shaft 146 and meshes with the stepcone 151 providing four differing driving speeds for the back gear or pinion 117. The reversing motor 150 is mounted on the adjustable platform 164 having a bracket 167, pivotally mounted on the lug 166 by the pivot 165, said lug being cast on the end of the supporting tube 160 which has a slotted hole 168' through which the adjusting screw 168 tapped into the bracket 167 and having a reduced inner section holding the compression spring 170 against the inner wall of tubing 160, so that said adjusting screw 168 may be set to give proper spring tension to the driving belt 149 connecting said stepcones 151 148. The entire motor is further adjustable vertically and pivotally by thus adjusting its supporting tube 160 whose lower edge rests on the screw 161 (see Figs. 1 and 3) tapped through the lug 162 and held in its adjusted position by nut 163. For pivotal adjustment as required for the nonreversible motor 150' the round vertical socket 282 furnishes the bearing for the supporting tube 160 to which the collar 179 is mounted and on which the handle 180 having a nose 181 fitting into suitable slots 181' is holding said motor 150' in its position shown in Fig. 7 for driving the back gear. In Fig. 6 the motor and its stepcone are shown in dotted position 151', as is the handle 180' for connecting with the direct drive sheaves 183 183', of which the sheave 183 is screwed on separately and has a slot 298 to still reach the operating screw 113' of the permanent chuck 113. It will be noted that in either position said motor 150' turns the spindle in the customary direction of arrow 296 required for a right hand drill 297, and it only requires lifting of said handle 180 turning on its pivot 182 to lift the nose 181 out of its socket, give the motor its required half turn with said handle and drop it in the opposite slot 181'. A further slot 181'' is provided for giving the motor only a quarter turn, so a belt may be run to any apparatus held on the crossbeam 55, or other locations. The nonreversible motor 150' is lower priced, as is the common on and off switch 176 with its turning knob 177; and said switch is mounted on the flange 176' forming part of collar 179 as shown in the sectional view in Fig. 6 (see line 6—6 of Fig. 7). The line wire 178 supplies the electric current to said switch, from which it is transferred to the motor 150' by the connecting wire 175. Figs. 1, 2 and 3 show the reversible motor 150 with its connecting socket 152 from which the cable 153 leads to the reversing switch 154, and said switch is supplied with electric current by the line cable 156, so that said motor may be driven right or left hand, for either back gear or direct driving by switching the handle 155 from its shown "off" position either to the right, or to the left. Said switch 154 is suitably mounted on the supporting tube 160, so that for assembling or shipping said motor 150 may be mounted on its platform 164 and properly wired and connected to said switch, and this motor unit being all assembled on said tube 160, is then lifted out or inserted into the vertical socket 282, is vertically adjusted by the screw 161 for the proper length and tension of the driving belt, and then locked in its proper position by the setscrew 283. Said hollow storage section 190 of the headstock H, by opening said door 186, also furnishes access to said adjusting screw 161. For endwise adjustment of the entire headstock H on the bed B respectively on its rails 25, a hole 89 is provided in the crossbeam 55 (see Figs. 10 and 20) which is in line with the adjusting pin 87 of the headstock, a suitable pin is temporarily put in said hole 89 and the adjusting bar 84 with its holes 85 is dropped on to said adjusting pins.

The slide S is moved until said pins fit two of said holes, then the four bolts 188 are loosened, and the headstock is then pushed forward or backward by the vise screw 30, or by the handwheel 60, when the vise nut 33 is unlocked. The slide is moved repeatedly and the adjusting bar changed to other holes 85 until the headstock is in the desired position, when it is locked by tightening said bolts 188. In Fig. 3 the movable jaw 20 and other parts are irregularly broken away to best bring out the construction of the headstock and its related parts, leaving the spindle out entirely and showing only a small section of gear 116 to show its meshing with the pinion 117.

The unit system applied in this machine as one of the leading features of this invention will now be further described by explaining the various set ups of these units on the crossbeam 55, as shown in Figs. 1, 2, 17, 18, 20 and 22, as well as further shown in detail in Figs. 23 to 31.

The drill unit D shown in working position in Figs. 1 and 2, is best shown in detail view Fig. 24 with 276 276' as the principal parts of the angle plate, and 277' 227' as reinforcing rigs. The gibs 58' and 225 with their respective taper faces 57' 226' fit the gibs 57 of the crossbeam 55 and the adjusting gib 225 (see Fig. 30) has the adjusting bolts 226 firmly mounted in a vertical position to freely pass through the holes 226'' (see Figs. 18 and 19) and bring the rabbet 225'' in alinement and contact with the ledge 223, so that the lower edge 222 forms the constant contact of the adjusting gib 225, while its bevel surface 226' is drawn up to the gib 57, of the crossbeam 55 either for locking thereto, or for sliding contact therewith according to the service required, and the lock nuts 227 are tightened and set accordingly. The front face 276 has the machined slots 261 for bolting work to the said face, and has the hole 263 in alinement with the headstock-spindle for ordinary drilling.

The milling unit M, shown in Figs. 1, 2, 19, 23 and 25, consists mainly of the apron 270 and the feedscrew 209 with its nut 208 with its guide pads 262. These parts are readily attached to the drill unit D and co-act therewith. The apron 270 is passed in vertical alinement over said face 276 by the slides 275' passing the edges 277 in snug sliding contact to a position where the nut 208 with its guide pads 262 passing through said slots 261 and its taper pins 262' meshing with suitable holes in said apron 270 are firmly connected by capscrews 207 (see Figs. 1 and 19), however said pads are slightly higher than the thickness of the plate 276'', so that said apron can slide vertically on said plate by turning the crank handle 203 connected to feedscrew 209 passing through nut 208, and being held in position by the cap 205 mounted to the top of said plate by capscrews 205' passing into the tapped holes 205''. Said feedscrew 209 is held against endplay by its shoulder 206 and the collar 204 bearing against the opposite sides of the cap 205, as well as the end 209' bearing flat against a rib 227', and the entire feedscrew assembly is held together by the nut 202', so that after removal of the four capscrews 205' and 207, said assembly is removed as a whole, said apron 270 slipped off and the drill unit D is again used as such. When used for jigs or other accurate drilling as shown in the set up Figs. 1 and 2, the milling unit M is used for accurately locating the stock 199 which is held by the bars 200 suitably screwed to the apron 270, and firmly mounted by the setscrews 201, while the sideway adjustment of the stock is made by shifting the drill unit D on the crossbeam 55 for spotting the desired center, then said unit is firmly mounted on said crossbeam by tightening said nuts 227 which draws the bottom surface 55'' tightly to the surface 55' of said crossbeam and further brings the bevel surface 57' in rigid alinement with the gib 57 of the crossbeam, which action is brought about by the improved construction of the adjusting gib 225 and its setting arrangement, allowing the free use of a wrench on said nuts 227, while all of said adjusting parts still pass the rest R, or any other part mounted against the pad 56. The set up for milling shown in Fig. 23 mounted on the apron 270, are the bars 269 held by screws 270', which in turn hold the vise 268 by setscrews 271, and said vise is gripping the stock 267, which may be any length but is supported for cutting by the universal angleplate P also mounted on said apron and co-acting with said vise for operating on four different sides of said stock.

The lathe unit L shows in its upper part a tool rest of known construction. However, its lower support is new and comprises the turret 220, allowing the tool rest to be swung clear around and be held in any position by tightening the screws 218 which clamps the turret plate 221'. The mounting base 221 (Fig. 19) extends to one side of the turret a considerable distance, and can be set in the reverse position as shown in Fig. 19, thus allowing the turret to overhang the outer limit of the crossbeam 55 for turning large diameter stock, as well as setting the connecting bar 214 for long stock to be operated on the milling unit M (see Fig. 19). This also shows the same adjusting gib 225 set against the ledge 223, and being tightened by nuts 227, which acts in like manner against both gibs 57 of crossbeam 55 when it is turned end for end.

The rest unit R, best shown in Figs. 26 and 27, is shown in set ups for turning bar stock Figs. 17 and 18, where it is used as a steady rest, and in set up Fig. 20 where it is used as a tailstock. The rest R has a gap 249 straddling the vise ram 46 as well as the rear end 49' of the vise jaw 19, the base lugs 248 have rabbets 251 fitting the rails 25 and their inner edges 27', while the clamps 252 with their cast in bolts 253 pass loosely through the holes 253' and by tightening the nuts 256 the rest R is firmly held to the rails 25. If used for chucking (see Figs. 26 and 27) or as a follow rest (see Figs. 17 and 18) the nuts 256 are loosened and the clamps 252 hang in sliding position with their heels 255 set in recesses 254 keeping them from turning. When said rest R is used for chucking or as a follow rest, then the bolts 250 loosely passing through holes 250', which are bored correctly in line through both said rest and the crossbeam 55, firmly connect said rest and crossbeam by tightening the nuts 260, thus drawing said rest tightly against the finished pads 56. The rest R is of rigid construction, with its sides 258 258' finished for correct alinement with said crossbeam, respectively its finished pads 56; and terminates into the head 246 having a large bore 246'' forming a ring like opening through the wall of which, three evenly divided holes are tapped to receive the setscrews 239, whose inner ends bear against the rear side 243' of jaws 243, whose supporting flanges 240 have a hole 245 through which passes the capscrew 246' screwed into tapped holes, and positioning said three jaws as shown in Fig. 27, so that said setscrews 239 being set against said flanges 243 center and hold the drill 259 on the three edges 255, which are slightly flattened with a suitable round mill while in said position, and thereby hold said drill in absolute alinement with the headstock spindle, while said long jaws 244 have a powerful grip on said drill or any other object. This chucking feature of rest R is of considerable value in the production of bushings or any article requiring a correct center bore. It will be noted that the said jaws 243 can be swung backward so the rear jaw sides 243' will reach the bore 246'', by drawing said setscrews 239 back said distance, which will then accommodate a considerable diameter within said jaws, as required when the rest R is used as a steady rest, or as a follow rest (see Figs. 17 and 18). The rest R will accommodate still larger diameters, by removing the jaws 243 and just using the setscrews 239 for holding such stock central for above stated services. The rest R, having the finished side surface 258' can further be used for drilling flat stock, and the holes 247 are provided for clamping such and other stock, for said purpose.

The tailstock T will now be described, it has the flanges 233 and the hollow section 233' (see Fig. 29) embracing the stationary jaw 19 (see Fig. 20)

of the vise forming part of the stationary structure surrounded and passed by the slide S, of which the jaw 20 is a part. Said flanges 233 are provided with slots 234, through which the long wedge 96 is passed and driven tight against the neck 19' and 19", this sets the tailstock tight against the section 52' and the top edge 52 of said jaw and meshing with the machined edge 232, lines said tailstock up properly with the headstock H. Said slots 234 are wide enough to leave a clearance 235 for giving the wedge 96 proper room for drift. The upper section of said tailstock T terminates into the bearing 231 having the bore 231' receiving the long tailstock center 92' having the regular cone point on one end, and a countersunk center 92" on the other. As the said tailstock is stationary the long center is required for adjustment to reach and hold the stock; and for further adjustment the headstock is moved and set towards the tailstock. When said center 92' is properly set it is held in position by tightening the setscrew 236, the entire arrangement is to be as simple and inexpensive as possible.

The set up Fig. 20 shows a reinforcement of the tailstock H, by the rest R also fitted for tailstock service by inserting the bushing 237 into said bore 246" having a flange 238 resting against the outer surface 240', while its section 237' is provided with a clearance hole 239' for receiving one of the setscrews 239 for holding said center 92' in its adjusted position as shown, holding the mandrel 265 on which the pulley 246 is driven, while the headstock center 92 is holding the other end and the dog 266 connecting to the face plate 285 holds the entire set up ready for turning said pulley. It will be noted that this tail stock set up is of great resistance for heavy cutting or turning operations, while either tailstock is sufficient for the average service required. It will further be noted that the crossbeams 55 is provided with cut outs 56' (see Fig. 19) for receiving the base lugs 248 which can be passed underneath said crossbeam 55 when said rest R so requires to be set, and when equipped as a tailstock and bolted against the crossbeam 55 is then in moving position and thus substitutes for the screw feed of the regular lathe tailstock.

The set up for turning shown in Figs. 17 and 18 has the rest R bolted against the crossbeam 55 and serves as a following rest, holding the bar stock 230 in revolving position in its jaws 243, and though the latter is long even thin stock is supported firmly for turning. The lathe unit L being set and locked in suitable position, the said turning as shown is done by moving the slide S for feeding the tool 228 the long way, and the cross feed by turning the handle 217 in the customary fashion.

The set up for milling shown in Fig. 19 has the lathe unit L firmly mounted in proper position on the crossbeam 55, while the milling unit M is set for sliding on the crossbeam, the drill unit D forming the slide as above described, while the connecting bar 214 is mounted thereto by bolt 215, and the free end passing through the toolpost is mounted therein in proper position as shown, and the sliding motion of the milling unit on the crossbeam is applied by turning the feedscrew of the tool rest with its handle 217. The vertical feeding for milling is done by turning the screw 209 by its handle 203 either way for sliding the apron 270 up or down on the plate 276". The third motion required for milling is provided by the vise screw 30 moving the slide L in endwise direction.

A drop hammer function may be performed by the vise jaws. After releasing the vise nut 33 by the lever 36, the slide S is operated for hammer action with the handwheel 60. The movable jaw 20 being part of the casting of the heavy slide, momentum of the entire weight of from 150 to 250 pounds in the present machine is exerted in the hammer action of said moving slide and jaw 20 against any object held against the stationary jaw 19.

Various changes and modifications of my utility machine are considered to be within the spirit of the invention and the scope of the following claims.

I claim:

1. In a machine tool, the combination with a bed provided with longitudinal guide means, of a carriage slidable on said guide means with reference to said bed, and a table carried by said carriage and having its greatest length transverse with respect to said bed, the length of said table being materially in excess of the width of said bed, and the top of said table comprising a supporting surface substantially all of which is usable for the mounting of tools and work as required.

2. In a machine of the character described, the combination with a bed and a headstock mounted on said bed and provided with a high center, of a carriage provided with guide means upon which it is reciprocable longitudinally of said bed to and from said headstock, and a beam-like table fixed to said carriage and disposed transversely thereof with its upper surface at a height materially above the level of said bed whereby to minimize the weight of attachments interchangeable upon said table in alignment with the center of said headstock, substantially the whole surface of said table being available for the mounting of work and attachments thereon.

3. A combination tool including a bed, a headstock mounted on said bed, a vise having a fixed jaw substantially at the end of said bed, a movable jaw outside of the end of the bed, means supporting said movable jaw for movement to and from said bed and fixed jaw, work support means, and means mounting said work support means upon a portion of said vise in operative work receiving alignment with the headstock.

4. In a combination tool, the combination with a bed and headstock mounted thereon, of a vise mounted at the end of said bed and including a fixed jaw substantially registering with the end of the bed and a movable jaw outside of the fixed jaw and provided with means supporting it for movement to and from said bed and fixed jaw, work supporting means including a carriage reciprocable on said bed in operative work receiving alignment with the headstock, and means connecting said carriage with said movable jaw and extending past said fixed jaw.

5. In a general utility machine, the combination with a bed and a vise carried thereby, of a headstock mounted on said bed and having a spindle substantially above the level of said vise whereby work aligned with said spindle may be extended across said vise, and a support connected with said vise and usable in connection with said headstock.

6. In a device of the character described, the combination of a bed and a vise mounted thereon, of a headstock mounted on said bed and provided with spindle means disposed substantially above the level of said vise whereby to give clearance above said vise for work aligned with said spindle means, a carriage reciprocable on said bed and connected with a portion of said vise, and means arranged for connection with said carriage and vise comprising a support adapted to carry work at the level of said spindle means.

7. In a machine of the character described, the combination of a bed provided with a headstock, a vise spaced from the headstock and including a movable jaw and a nut and screw for moving said jaw, a carriage slidable upon said bed and connected with the movable jaw of the vise, and means for releasably fixing the position of said nut, said means being adapted upon its release to permit the adjustment of said slide and jaw independently of the manipulation of said screw.

8. A device of the character described comprising a bed, a work support movable upon said bed, a vise including a movable jaw connected with said work support, actuating means for said jaw including screw and nut elements one of which is fixed against axial movement with reference to said jaw and the other with reference to said bed, and means for releasably fixing one of said elements to permit of the operation of said jaw and work support by the interaction of said elements, said means, when released, being adapted to permit of the operation of said jaw and support independently of the operation of said elements.

9. A device of the character described comprising a bed provided with a headstock, a work support movable upon said bed, a vise including a movable jaw connected with said work support, actuating means for said jaw including screw and nut elements one of which is fixed against axial movement with reference to said jaw and the other with reference to said bed, and means for releasably fixing one of said elements to permit of the operation of said jaw and work support by the interaction of said elements, said means, when released, being adapted to permit of the operation of said jaw and support independently of the direction of said elements, together with separate mechanical actuating means for said support and movable jaw.

10. In a general utility tool, the combination with a bed, of a vise including a jaw fixed to said bed and a movable jaw reciprocable with reference thereto, a slide with which said movable vise jaw is connected, a screw and nut provided with an operative connection between said movable jaw and fixed jaw for the operation of the vise, said connection including means for rendering said screw inoperative to control the movable vise jaw, and a handwheel, pinion and rack comprising alternative means for actuating said vise jaw.

11. In a machine of the character described, the combination with a bed and a headstock, of a vise located at one end of the bed and including a fixed jaw and a movable jaw outside of said bed and movable to and from the fixed jaw, a table slidable on the bed, means connecting said table with the movable vise jaw, means mounted on said bed for the mechanical operation of said table and vise jaw, and separate means for the actuation of said table and vise jaw comprising a screw and nut connected between the movable jaw and bed, said nut having a releasable anchorage device to permit the use of said first mentioned operating means and with reference to which said nut is adjustable upon said screw to comprise a stop for said jaw and table during the use of said first mentioned operating means.

12. In a machine of the character described, the combination with a bed and a headstock mounted thereon and including spindle means disposed at a substantial height above said bed, a vise carried by said bed and including movable and fixed jaws and a support adapted for cooperation with said headstock and adapted to be fitted to one of said jaws, and means including a laterally disposed wedge for quickly attaching and releasing said support with reference to the jaw upon which it is mounted.

13. In a device of the character described, the combination with a bed and a headstock, of a vise mounted on said bed and having relatively movable jaws and a tailstock formed to fit one of said jaws and provided with ear portions extending thereabout, and a wedge passing through said ear portions in contact with said last mentioned jaw whereby to anchor said tailstock thereon.

14. In a machine of the character described, the combination with a headstock and a vise including relatively movable jaws, of a support reciprocable on the bed and connected with the movable vise jaw, and a table releasably hooked to said support and provided with a quickly detachable connection to the movable vise jaw.

15. In a general purpose tool, the combination with a supporting bed having a bearing surface and marginally undercut grooves, of a member having a bearing surface slidable upon the surface of said bed and adapted to be rigidly clamped thereto, gib means along one side of said member surface, a projecting flange extending along the other side of said member surface, and a second gib means shouldered to abut the margin of said flange and provided with an undercut beveled clamping face, and an adjusting screw connected with said second gib means and disposed transversely of said face whereby to fulcrum said second gib means upon said flange in the adjustment thereof.

16. In a general utility tool, the combination with a bed and a headstock, of a beam disposed transversely of said bed and comprising a table, a tool rest slidably and removably mounted on said table and including an elongated base, a turret nearer one end of said base than the other, and a tool support rotatable on said turret, whereby the position of said tool support may be varied with reference to the work by angular movement of said turret and by the reversal of said base on said beam.

17. In a general utility machine, the combination with a headstock provided with a spindle, of a work mounting device usable for boring and comprising a plate, of means for supporting the plate in a vertical position, a supplemental work support comprising a slide, means for releasably engaging the slide with the plate for vertical movement thereon, means releasably connected between said plate and slide for adjustably fixing the position of said slide with reference to said plate, and means for fixing work to said slide.

18. In a general utility machine, the combination with a bed, a headstock and a slidable work support, of a rest connected with said work support for movement to and from said headstock, and a chuck carried by said rest and provided with suitable jaws radially adjustable to and from the axis of said headstock, whereby to be adapted for supporting a tool or as a follow rest for work.

19. In a device of the character described, the combination with a headstock and a bed therefor, of a support connected with said bed in a position spaced from said headstock and provided with a bore in axial alignment with the headstock and materially larger than the centering pin receivable therein, a centering pin axially aligned with the headstock and extending through said bore, and means on said support and extending across said bore to engage said pin to fix the position thereof.

20. A combination tool comprising with a headstock and a bed therefor, a plurality of supports independently mounted on said bed at different distances from said headstock and each provided with a bore axially aligned with said headstock, a centering pin fixed in the bore of one of said supports and projecting through the bore of the other, said pin being materially smaller in diameter than said last mentioned bore, and means removably mounted on the support containing said last mentioned bore for engaging the periphery of the centering pin in a manner to fix the position of said pin in said larger bore.

21. A combination tool comprising with a headstock and a bed therefor, a plurality of supports independently mounted on said bed at different distances from said headstock and each provided with a bore axially aligned with said headstock, a centering pin fixed in the bore of one of said supports and projecting through the bore of the other, said pin being materially smaller in diameter than said last mentioned bore, and means removably mounted on the support containing said last mentioned bore for engaging the periphery of the centering pin in a manner to fix the position of said pin in said larger bore, said means comprising at least one set screw radially adjustable in the last mentioned support across said larger bore.

22. A combination tool comprising with a headstock and a bed therefor, a plurality of supports independently mounted on said bed at different distances from said headstock and each provided with a bore axially aligned with said headstock, a centering pin fixed in the bore of one of said supports and projecting through the bore of the other, said pin being materially smaller in diameter than said last mentioned bore, and means removably mounted on the support containing said last mentioned bore for engaging the periphery of the centering pin in a manner to fix the position of said pin in said larger bore, said means comprising a plurality of set screws adjustable radially of said larger bore in said last mentioned support, and a plurality of jaw arms pivoted to said last mentioned support outside of the bore thereof and axially extended into said bore to receive the pressure of said set screw.

23. A tool comprising the combination with a headstock and a bed, of a centering pin axially aligned with the headstock, a support therefor mounted on the bed and provided with a bore arranged to receive the pin and substantially larger than the pin in diameter, said support having a plurality of screw threaded openings approximately radial with respect to said bore, jaw arms pivoted to a face of said support outside of said bore and adjustably engaging said centering pin to fix its position in said bore, set screws adjustable in said screw threaded openings, and means carried by said jaw arms projecting into said bore in the path of the several set screws to be respectively acted on thereby.

24. In a general utility machine, the combination with a bed, of a vise mounted thereon and including a movable jaw and a table attachment including a table member, a support for one end thereof fitted for vertical sliding movement with respect to said movable vise jaw and confined against axial movement with respect thereto, a second support for the other end of said table having an inclined cam surface, and a complementary wedge member having means fixing it against displacement with respect to said bed and co-acting with said cam surface for raising and lowering said table upon movement of the vise jaw with which the table is connected.

25. In a general utility machine, the combination with a bed, a headstock thereon, a slide movable on said bed and a vise mounted on said bed and including a movable jaw, of a detachable work supporting table comprising a wedge member detachably carried by said slide and provided with means fixing it against movement with respect to said bed during the operation of said slide therebeneath, and a table having supporting means engaged in part by said wedge member and complementary thereto to receive vertical adjustment therefrom and also connected with the movable jaw of said vise to receive axial movement therefrom, the supporting means connected with the vise being fitted to the movable vise jaw for vertical reciprocation thereon.

26. In a general purpose machine tool, the combination with a bed, of a work support, a headstock unitarily provided with a spindle having a pulley, a motor having a shaft with exposed pulleys at both ends, and variable speed driving connections from said source of power to said spindle including a jack shaft having a free-end pulley, and gear connected with said spindle, and belt means for connecting said motor shaft either with said spindle or jack shaft, whereby said headstock is self-contained and said spindle may be operated at a plurality of speeds irrespective of the position of said headstock on said bed and independently of all extraneous driving connections.

27. A general purpose machine tool comprising in combination a bed, a work support, a headstock adjustable on the bed, a spindle carried by the headstock, a post mounted on the headstock and adjustable at right angles to the spindle, a motor carried by said post, and variable speed connections from said motor to said spindle unitarily assembled with said motor upon said headstock for a movement therewith upon said bed, whereby said spindle may be driven at a plurality of speeds irrespective of the position of the headstock on the bed.

28. A general purpose tool comprising the combination with a bed and a work support adjustable thereon, of a headstock adjustable upon said bed and provided with a spindle, and a self-contained driving means for said spindle independent of all extraneous connections, said driving means including a motor support movable upon said headstock at right angles to the axis of said spindle, a motor carried thereby and provided with a drive shaft having both ends free and a plurality of driving pulleys on the free ends of the motor drive shaft, a jack shaft provided with free end driving pulleys and geared to said spindle, and an exposed driven pulley upon said spindle, the pulleys of said jack shaft and spindle being alternatively connectible by belt with the pulleys of said motor.

29. In a general purpose machine tool, the combination with a bed, a work support and a headstock, of self-contained driving means unitarily carried by said headstock and comprising a spindle provided with an exposed pulley and a single gear, a jack shaft provided with a free end pulley and a single pinion meshing with said gear, a motor provided with a drive shaft with free ends and separate pulleys aligned respectively with the jack shaft pulley and the spindle pulley, and belt means interchangeably connecting said motor pulleys with either of said jack shaft or spindle pulleys, whereby to provide for a variety of spindle speeds independently of extraneous connections.

30. In a general purpose machine tool, the combination with a headstock, a bed member, and a work support member, one of said members having complementary bearing surfaces permitting the sliding movement of said work support member on said bed member, of means for releasably clamping said members together comprising undercut marginal clamping surfaces along the sides of one of said members, a gib connected with the other member and engaged with one of said surfaces, a flange connected with said last mentioned member and disposed adjacent the other of said surfaces, a shouldered gib bearing on said flange and engageable with said other surface, and means releasably acting through said other member upon said shouldered gib to draw it into clamping relation with the grooved member.

31. A general purpose machine tool comprising the combination with a machine frame bed, of a headstock mounted thereon, a slide mounted thereon and provided with a transverse beam comprising a sub-bed and having undercut clamping surfaces extending longitudinally of its sides, a work support slidable upon said sub-bed, gib means carried by said work support and engaging one of the clamping surfaces of said sub-bed, pivot means carried by said sub-support adjacent the other surface of said sub-bed, and a movable gib shouldered in engagement with said pivot means to be positioned thereby for clamping engagement with said sub-bed, and clamping means acting downwardly through said work support on said movable gib in a direction to force it against the adjacent clamping surface of said sub-bed.

32. In a general purpose machine tool, the combination with a bed and a headstock provided with a spindle, of a tailstock and tool rest comprising a support adjustable on said bed and provided with clamping means axially aligned with the spindle and interchangeably adapted for carrying a tailstock center or a tool.

33. In a general purpose machine tool, the combination with a bed and a headstock provided with a spindle, of a support adjustable upon said bed and alternatively adapted to support work or tool, said support having an opening aligned with said spindle, radial set screw means operatively adjustable into said opening, and arm means pivoted to said support and provided with an axial extension into said opening engageable by said set screw means.

34. In a general purpose machine tool, the combination with a bed and a headstock, of a beam disposed transversely of said bed and comprising a sub-bed upon which a plurality of work supports are mountable and interchangeably movable to a position of alignment with said headstock, a work support mounted on said beam, and an adjusting mechanism for said work support also mounted on said beam and operatively connected with the work support.

35. In a general purpose machine tool, the combination with a bed provided with longitudinal guide means, of a headstock having a spindle, a beam extending transversely of said bed and operatively mounted on said bed for sliding movement longitudinally thereof, and a plurality of machine units slidably mounted on said beam, the length of said beam transversely of said bed being sufficient to permit either unit to be moved from an operative position of alignment with said spindle to an inoperative position out of the way of another such unit used with said spindle.

36. A general purpose machine tool comprising the combination with a bed, of a headstock having a tubular spindle, means for alternatively clamping work or tools or an auxiliary work support in said tubular spindle, and a tailstock and rest device detachably mounted on said bed, said bed being designed, in the absence of said device, to afford substantial clearance for long work extending through said hollow spindle.

37. In a general purpose tool, the combination with a bed and a tailstock device thereon, of a headstock provided with a bearing having spaced conical races, a pair of spindles interchangeably engageable in said bearing, one of them being provided with anti-friction means engageable with said races and the other with a solid bearing means engageable with said races, and means carried by said headstock for interchangeably driving either of said spindles.

38. In a general purpose machine tool, the combination with a bed and a support adjustable thereon, of a headstock provided with a tubular bore comprising a spindle bearing and having race bearing surfaces at points spaced axially of said bore, a tubular spindle adapted to operate at relatively slow speeds in said bearing bore and provided with bearing surfaces complementary to said race surfaces, driving mechanism for said spindle with which said spindle is releasably connected, said bore being adapted to receive a smaller and relatively higher speed spindle having anti-friction means co-operating with said race surfaces and adapted for connection with the same driving mechanism.

39. In a general purpose machine tool, the combination with a bed, a work support, and a headstock, of a headstock spindle provided with a pulley and a gear, a jack shaft having a pinion meshing with said gear and provided with a free end and a pulley mounted thereon, a motor having a drive shaft and pulley means mounted thereon, and belt means whereby the motor shaft pulley means is connectible either with the pulley of the jack shaft or the pulley of the spindle, and a motor support interposed between said headstock and motor and providing a vertically adjustable and resiliently yieldable mounting for said motor.

40. In a device of the character described, the combination with a driven shaft provided with a gear, of a jack shaft provided with a gear and eccentric bearings adjustable to move the jack shaft to and from mesh with the gear of the driven shaft, a pulley exposed on a free end of the jack shaft and movable bodily therewith in the adjustment of said eccentric bearing, and a drive shaft provided with a pulley toward which said jack shaft moves in the eccentric adjustment of said bearing to unmesh said gears, and a belt connecting the respective pulleys and adapted to be loosened when the jack shaft is moved eccentrically to unmesh said gears.

41. In a general utility machine tool, the combination with a work support, of a box-shaped bed having at its extreme sides rails comprising a table surface on which said work support is mounted, a tool support likewise mounted upon said rails, one of said supports being adjustable with reference to the other upon said rails, and a central sink bracing said bed and lying between and beneath said rails to comprise a receptacle for the reception of shavings and lubricant.

42. In a general utility machine tool, the combination with a box-shaped bed provided with supports at its respective ends and having at its extreme sides rails with corresponding gaps in registering portions thereof, headstock and tailstock means mounted on said rails for relative adjustment with respect to each other upon said bed, and a pan connecting the sides of said bed between and beneath said rails and across and beneath the gaps therein, whereby to reenforce said bed and to receive cuttings and lubricant from work mounted between said headstock and tailstock means.

43. A combination tool including a bed and headstock mounted on said bed, a member fixed at the end of said bed opposite said headstock, a second member movable to and from said first member and provided with means guiding it for such movement from said bed, said second member being outside of the end of said bed, and a work support mounted on said second member in operative work receiving alignment with the headstock, together with means fixing the relative positions of said members and determinative of the spacing between said work support and headstock.

44. In a combination tool, the combination with a bed and a headstock mounted thereon, of a member fixed in substantial registry with one end of the bed in substantial alignment with the headstock, a second member outside of the first mentioned member and provided with means guiding it for movement with respect to said bed and said first member in substantial alignment with the headstock, a work support comprising a carriage reciprocable on said bed in operative work receiving alignment with the headstock, a screw operative between said first and second members for the adjustment and fixation of the second member, and means extending past said first member for connecting said second member with said carriage, whereby to determine the movement and position of said carriage with respect to the screw-controlled movement of said second member.

EMIL R. LOCHMAN.